UNITED STATES PATENT OFFICE.

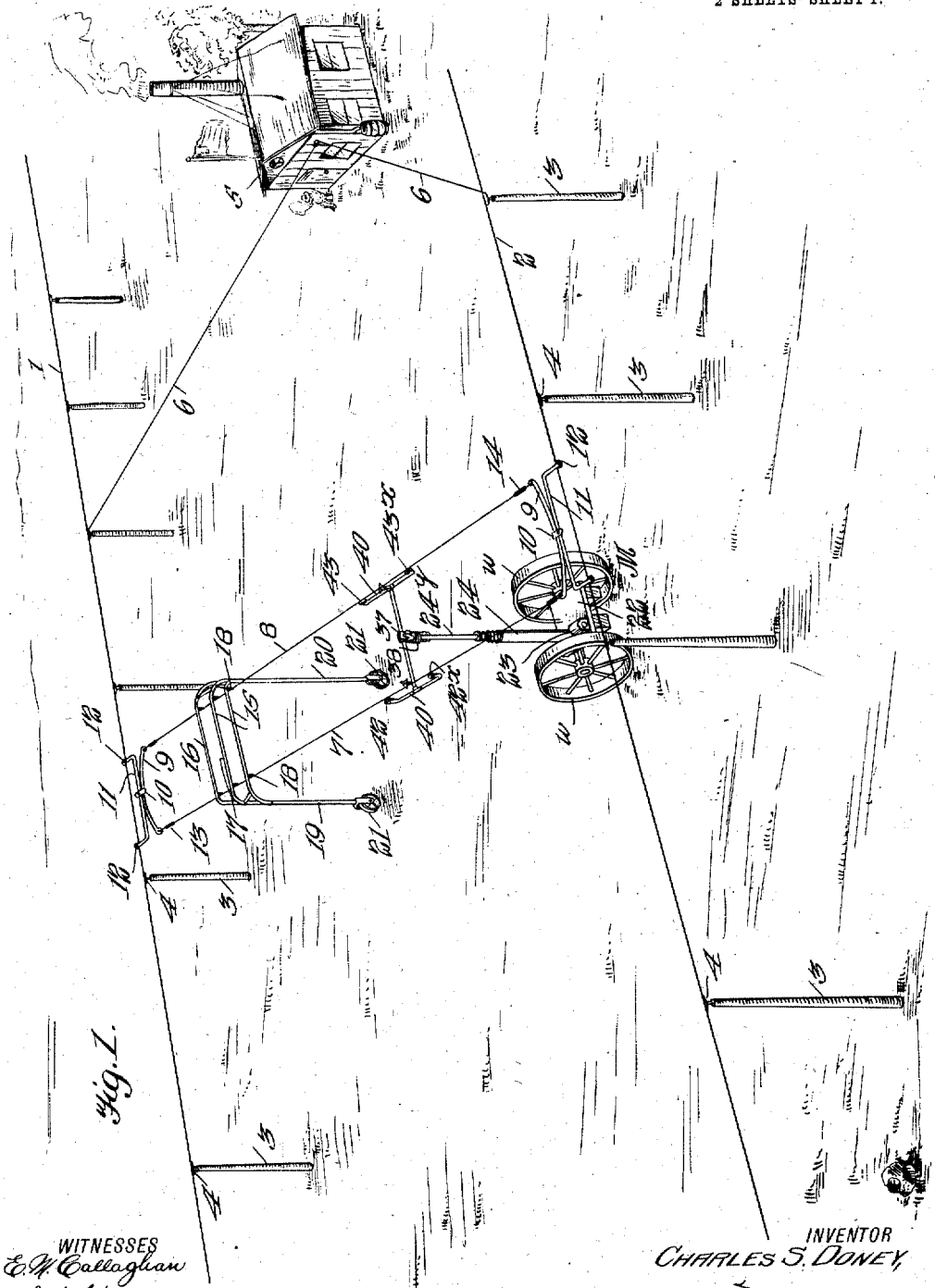

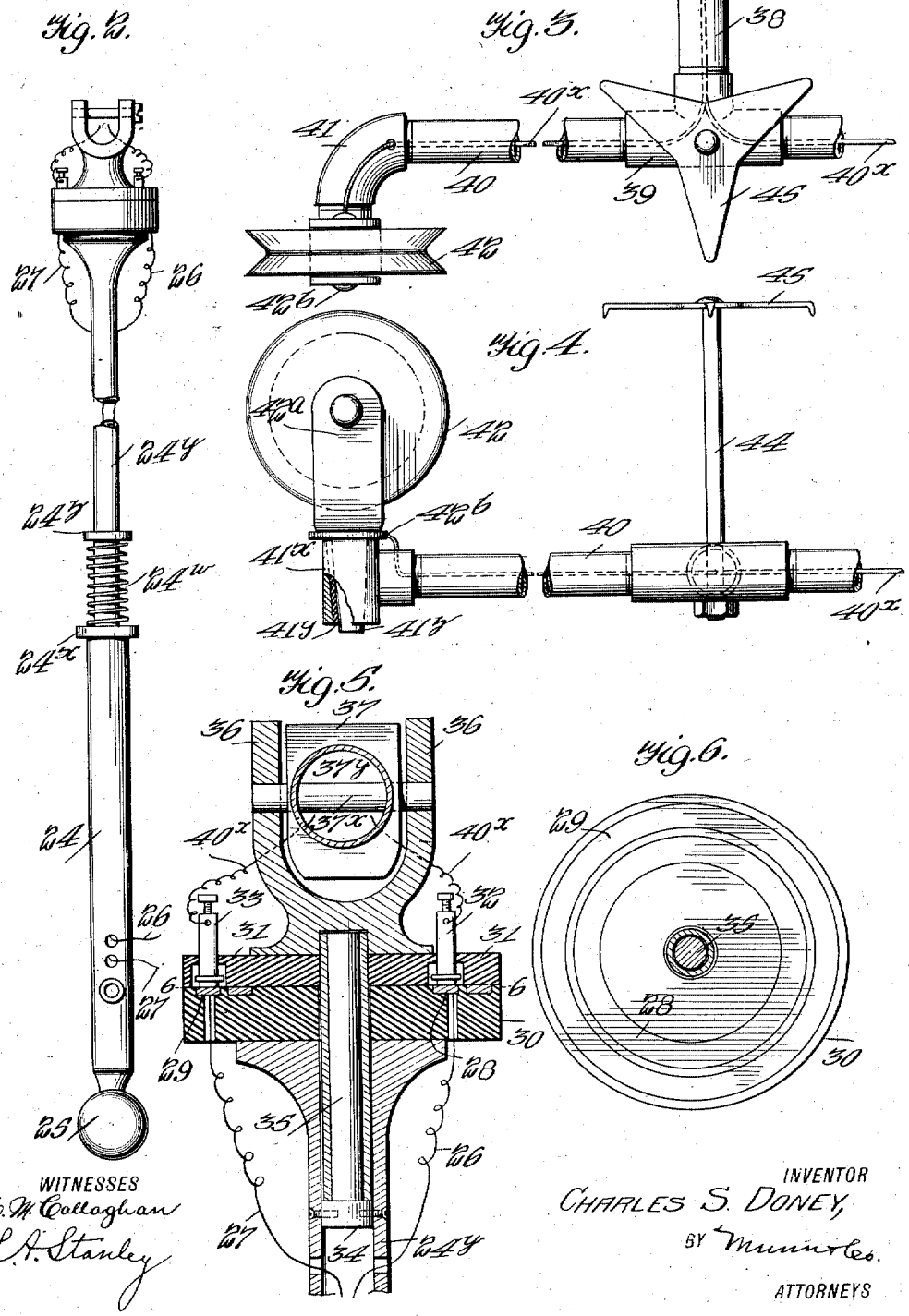

CHARLES SAMUEL DONEY, OF WALLACE, IDAHO, ASSIGNOR OF ONE-THIRD TO JOHN THOMAS BOYLE, OF WALLACE, IDAHO.

ELECTRICAL AGRICULTURAL SYSTEM.

1,085,802.  Specification of Letters Patent.  Patented Feb. 3, 1914.

Application filed February 13, 1913. Serial No. 748,112.

*To all whom it may concern:*

Be it known that I, CHARLES SAMUEL DONEY, a citizen of the United States, and a resident of Wallace, in the county of Shoshone and State of Idaho, have made certain new and useful Improvements in Electrical Agricultural Systems, of which the following is a specification.

My invention relates to improvements in electrical agricultural systems, and it consists in the combinations, constructions and arrangements herein described and claimed.

An object of my invention is to provide an improved means for supplying power to agricultural tractors or motor vehicles such as gang plows, cultivators, seeders and the like, which will permit them to move readily over the ground.

A further object of my invention is to provide novel means whereby a trolley on the motor vehicle will move the wires from which it receives current to and fro as the tractor traverses the field.

Other objects and advantages will appear in the following specification and the novel features of the device will be particularly pointed out in the appended claims.

My invention is illustrated in the accompanying drawings forming part of this application in which—

Figure 1 is a perspective view showing the general arrangement of the system, Fig. 2 is a side view of the trolley pole, Fig. 3 is a plan view of a portion of one of the trolley wheel supporting members, Fig. 4 is a side view of the parts shown in Fig. 3, Fig. 5 is an enlarged sectional view through the upper end of the trolley pole, and Fig. 6 is a section along the line 6—6 of Fig. 5.

In carrying out my invention I provide a series of parallel stationary feed wires such as those shown at 1 and 2, which are supported upon poles 3 having suitable insulators 4. In the illustration, I have shown two of these parallel stationary feed wires, but it will be understood that as many may be used as occasion demands. These stationary feed wires are connected with a power house 5 by the lead wires 6.

Extending transversely between the stationary feed wires 1 and 2 are the movable feed wires 7 and 8. These movable feed wires are attached at their ends to eveners 9, the latter being pivotally connected by means of the clevises 10 to the U-shaped supports 11 which bear pulleys 12 arranged to run upon the wires 1 and 2. An insulating strip 13 is disposed between the end of the feed wire 7 and the evener 9 on one side of the field, and a similar insulating strip 14 is disposed between the end of the wire 8 and the evener 9 on the opposite side of the field.

The movable feed wires 7 and 8 may be supported at intervals by arches. These arches consist preferably of a central portion 15 and side portions 16 and 17. Each of these portions is rigidly connected to the movable feed wire by suitably insulated members 18. The three members 15, 16 and 17 form part of a frame of which the legs 19 and 20 form the supporting members. These legs are provided at their bottoms with wheels or rollers 21, and as will be seen from the figure the legs are off-set. That is to say, one of the legs is nearer the permanent feed wire 1 than the other. This is for the purpose of giving the supporting arch more stability. In the figure I have shown only one of these supporting arches, but it will be understood that as many may be used as are needed to carry the movable feed wires.

At M I have shown a portion of the motor vehicle. This, as stated above, may be any agricultural implement of the traction type, such as a gang plow, cultivator, etc. The specific construction of the motor vehicle forms no part of the present invention, and I have therefore shown only so much of the device as is necessary for a full explanation of the system itself.

Pivotally disposed on a shaft 22 in a bearing 23 carried by the motor vehicle is a lower portion of the trolley pole 24. This pole is designed to be situated midway between the wheels $w$ of the motor vehicle. The lower end of the pole bears a weight 25, which is designed to keep the pole in an upright position as the vehicle is moved along. The lower portion 24 of the trolley pole is provided with a stationary collar $24^x$. The upper section $24^y$ of the pole is smaller and is arranged to slide within the lower section. It is provided with a collar $24^z$. A spring $24^w$ is disposed between the collars or flanges $24^x$ on the lower trolley pole member 24 and the collar $24^z$ on the upper trolley pole member $24^y$. Both sections of the pole are hollow to receive the wires 26 and 27 which pass upwardly through the pole and are secured to the rings 28 and 29 respectively. The latter are disposed on the upper face of an insulating disk 30 carried by the upper trolley pole member 24^y. A registering disk or plate 31 is provided with a pair of spring-pressed contact pins 32 and 33, the former being arranged to engage the ring 28 and the latter the ring 29. On the inside of the upper trolley member 24^y is disposed a thrust bearing 34 against which the end of a shaft 35 bears. The non-conducting disk 31 is secured to the shaft 35 and the latter is secured to a fork 36. Within the arms of the fork 36 is a block 37 which is mounted on a pivot pin 37^x.

Extending through an opening 37^y in the block 37 is an arm 38. At each end of this arm is a T 29 which is connected by a pipe 40 with an elbow 41 bearing a socket 41^x. The latter is provided with an insulating bushing 41^y arranged to receive the pivot pin 41^z of a deep grooved trolley wheel such as that shown at 42 in Figs. 3 and 4. The bottom of the fork 42^a rests upon a conducting ring 42^b, which is insulated from the walls of the socket 41^x. Conductors, such as those shown at 40^x, extend from the ring 42^b through the hollow arms 40 and the arm 38. On the other side of the T 39 is a similarly mounted trolley wheel 42^x. The trolley wheels 42 and 42^x are connected on one side to the binding post 32, while the trolley wheels 43 and 43^x are connected on the other side to the binding post 33. Upon each T is mounted an upright 44 bearing a pivoted guard member 45 for keeping the trolley wire in position on the trolley wheels.

From the foregoing description of the various parts of the device the operation thereof may be readily understood. Power is supplied to the main stationary feed wires 1 and 2. The feed wire 1 is connected through the evener with the movable feed wire or trolley wire 8, while the stationary feed wire 2 is electrically connected through the opposite evener with the feed wire 7. The trolley wheels 42 and 42^x engage the feed wire 7, while the trolley wheels 43 and 43^x engage the feed wire 8. The spring 24^w tends to force the trolley pole upwardly. Now when the current is turned on by the controller (not shown) the machine is operated. As it is steered to the right or to the left i. e., in a direction transverse of the movable feed wires 7 and 8 the latter are shifted by means of the trolley pole and the trolley wheels 42—42^x and 43—43^x, this shifting of the movable feed wires being permitted by the pulleys 12 and the eveners 9. The supporting arches will also move laterally by the tension on the feed wires. It will be understood that the shifting of the feed wires is accomplished a little bit at a time. Thus if a plow is being used it will be only necessary to shift a distance equal to the width of the various furrows in going once across the field. The trolley pole is mounted to swing transversely of the feed wires, but cannot swing in a direction parallel with them. The weight which is attached to the lower end of the trolley pole tends to maintain the latter in a vertical position. The motor vehicle or tractor is designed to move along the movable feed wires in working the field. The arches which form the supports for the movable feed wires are of sufficient width to permit the passage of the motor vehicle or tractor between the sides of the arch. As the feed wires 7 and 8 are moved in a direction transverse of their length the auxiliary supports or arches are also moved so as to accommodate themselves to the position of the feed wires. The fork 36 of the trolley may be turned on the pivotal member 35 so as to accommodate the trolley to the direction in which the vehicle is going. The spring-pressed contacts 32 and 33, however, will bear on the rings 28 and 29 so as to provide power for the motor no matter in which direction the vehicle is headed.

The construction described above permits the operation of an electrical motor or agricultural implement over the entire field, the feed wires being moved automatically by the steering of the vehicle.

I claim:

1. In an electrical traction system, stationary feed wires, movable feed wires disposed angularly with respect to said stationary feed wires, means for slidably securing the ends of said movable wires to said stationary wires, a motor vehicle, a vertical trolley pole carried by said motor vehicle, said trolley pole having telescopic members, an arm carried by one of said telescopic members, trolley wheels carried by the ends of the arms for engaging the feed wires, the transverse movement of the motor vehicle serving to shift said feed wires in a direction at right angles to their length, and a supporting arch for said movable feed wires, said arch being movably mounted on the ground beneath said feed wires, and the legs of said arch being spaced apart to permit the passage of the motor vehicle.

2. In an electrical traction system, a series of parallel stationary feed wires, parallel movable feed wires disposed normally at right angles to said stationary feed wires, means including an evening device for slidably securing the ends of said movable feed wires to said stationary feed wires, a motor vehicle or tractor, a trolley pole carried by said motor vehicle, an arm carried by said trolley pole, a pair of trolley wheels carried at each end of said arm, one pair of trolley wheels being arranged to engage one feed wire and the other pair of trolley wheels being arranged to engage the other feed wire, means for preventing the trolley wheels from leaving their respective feed wires, the movement of the motor vehicle in a direction transverse of the feed wires serving to shift the movable feed wires in a direction at right angles to their length.

3. In an electrical traction system, a plurality of stationary feed wires, means for supplying current thereto, a pair of parallel movable feed wires, eveners connected at the ends of said movable feed wires, a U-shaped yoke pivotally secured to said eveners, each yoke being provided with a pair of rollers arranged to engage one of said stationary feed wires, a motor vehicle, a trolley pole carried by said motor vehicle, said trolley pole having telescopic members, one of said members being provided with a laterally extending arm, a pair of trolley wheels carried at each end of said laterally extending arm, one pair of said trolley wheels being arranged to engage one feed wire and the other pair of said trolley wheels being arranged to engage the other feed wire, means carried by the arm for preventing the trolley wheels from leaving their respective feed wires, said arm being swiveled at the top of said trolley pole to permit the free movement of the motor vehicle.

4. In an electrical traction system, a plurality of stationary feed wires, means for supplying current thereto, a pair of parallel movable feed wires, eveners connected at the ends of said movable feed wires, a U-shaped yoke pivotally secured to said eveners, each yoke being provided with a pair of rollers arranged to engage one of said stationary feed wires, a motor vehicle, a trolley pole carried by said motor vehicle, said trolley pole having telescopic members, one of said members being provided with a laterally extending arm, a pair of trolley wheels carried at each end of said laterally extending arm, one pair of said trolley wheels being arranged to engage one feed wire and the other pair of said trolley wheels being arranged to engage the other feed wire, means carried by the arm for preventing the trolley wheels from leaving their respective feed wires, said arm being swiveled at the top of said trolley pole to permit the free movement of the motor vehicle, and means comprising slidable spring-pressed contacts, and contact rings arranged to be engaged by said spring contacts for maintaining said trolley wheels in electrical connection with said motor during the movement of the swiveled arm.

CHARLES SAMUEL DONEY.

Witnesses:
FRANKLIN PFIRMAN,
KATHARINE RYAN.

---

Copies of this patent may be obtained for five cents each, by addressing the "Commissioner of Patents, Washington, D. C."